United States Patent Office.

SAMUEL C. UPHAM, OF PHILADELPHIA, PENNSYLVANIA.

Letters Patent No. 62,091, dated February 12, 1867.

---

IMPROVED NUTRITIVE MEDICINE.

---

*The Schedule referred to in these Letters Patent and making part of the same.*

---

TO ALL WHOM IT MAY CONCERN:

Be it known that I, SAMUEL C. UPHAM, of Philadelphia, Pennsylvania, have invented a Nutritive Medicine; and I do hereby declare the following to be a full, clear, and exact description of the same.

My invention consists of a nutritive medicine composed of the extract or essence of meat and sugar, dissolved in water in the proportions substantially as described hereafter, so that it can be easily administered to invalids who are in too prostrate a condition to take ordinary nourishing food.

I use as one of the ingredients in my nutritive medicine concentrated essence or extract of meat, which consists of the juices of meat obtained by boiling the latter in digesters, by pressure, &c., and by separating it from the fibrous tissues. This extract is well known both in this country and in Europe, and is sold in the form of soup-cakes or in cans, and used to a great extent by travellers. The essence or extract of meat which I prefer to use is that made by Tourtelot, of Chicago. It is sold in cans containing one pound of extract, which is of the consistency of very stiff jelly, a pound of this extract being declared by the manufacturer to contain the nutritious properties of twenty pounds of meat. I take one gallon of water and heat the same without bringing it to the boiling point, and in this hot water I dissolve two pounds of Tourtelot's extract of beef; I then add about fourteen pounds of the best refined sugar, and stir the whole intimately together; I then permit the mixture to cool, after which I bottle it and cork the bottles tightly. It is essential that there should be more than ten pounds of sugar to the two pounds of extract, as I have found that a less quantity will not prevent fermentation.

The sirup renders the medicine easy to be administered to invalids who are in such a prostrate condition as to prevent them from taking ordinary nourishing remedies. If desired, the preparation may be medicated to suit the disease of the patient, and may be more easily administered by the introduction into it of essences or drugs or condiments pleasing to the taste.

I claim as my invention, and desire to secure by Letters Patent—

A nutritive medicine, composed of the within-described ingredients, prepared in the manner and in the proportions substantially as set forth.

In testimony whereof I have signed my name to this specification in the presence of two subscribing witnesses.

SAM'L C. UPHAM.

Witnesses:
 H. HOWSON,
 JOHN WHITE.